Sept. 9, 1958 P. J. H. JANSSEN ET AL 2,851,632
CIRCUIT FOR PRODUCING SAWTOOTH CURRENTS IN THE VERTICAL DEFLECTION COILS OF TELEVISION RECEIVERS
Filed March 17, 1955
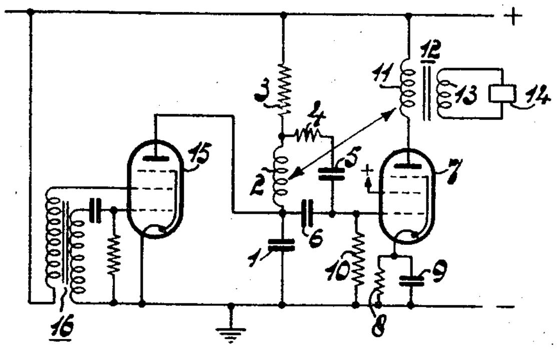
INVENTORS
PETER JOHANNES HUBERTUS JANSSEN
WOUTER SMEULERS
BY Fred M. Vogel
AGENT

United States Patent Office 2,851,632

Patented Sept. 9, 1958

2,851,632

CIRCUIT FOR PRODUCING SAWTOOTH CURRENTS IN THE VERTICAL DEFLECTION COILS OF TELEVISION RECEIVERS

Peter Johannes Hubertus Janssen and Wouter Smeulers, Eindhoven, Netherlands, assignors, by mesne assignments, to North American Philips Company, Inc., New York, N. Y., a corporation of Delaware Application March 17, 1955, Serial No. 494,934

Claims priority, application Netherlands March 27, 1954

3 Claims. (Cl. 315—27)

This invention relates to circuits for producing sawtooth currents in the vertical deflecting coil of a television receiver, which deflection coil is included via a coupling transformer in the anode circuit of a tube, a capacitor included in the control-grid circuit of the tube being periodically charged in a charging circuit comprising the series combination of a resistor and a winding of the transformer across which a voltage is produced, the polarity of which is opposite to the polarity of the voltage across the capacitor, the resistor and the winding being located outside the discharge circuit of the capacitor.

Known circuits of this kind are based upon recognition of the fact that, when a capacitor is charged via a resistor, the voltage of the capacitor does not increase linearly with time, since the charging current does not remain constant due to the counter-E. M. F. of the voltage of the capacitor. If a voltage counteracting the voltage of the capacitor is introduced into the charging circuit, a substantially linear increase in the voltage of the capacitor can be obtained and if the introduced voltage is higher than the voltage of the capacitor, it is even possible to cause the voltage of the capacitor to increase more than linearly with time.

The conventional coils for vertical deflection in a television receiver behave during the stroke of the deflection current substantially as resistors. If these coils are coupled by way of a transformer to the anode circuit of a tube, the substitution diagram for this anode impedance to a first approximation comprises the primary inductance of the transformer and in parallel therewith the resistance of the coil which is transformed to the primary side of the transformer. The coil and hence the resistor are traversed by a saw-tooth current and since the voltage across the resistor is equal to the voltage across the primary inductance of the transformer, a saw-tooth voltage appears across the inductance, which is thus traversed by a parabolic current. The anode current of the tube thus must comprise a sawtooth component and a parabolic component. For producing the two said components, it is frequently possible for the substantially linear sawtooth voltage set up across the capacitor to be supplied directly to the control grid of the tube if this tube exhibits a suitably curved anode current-grid voltage characteristic, and if the desired correction of the parabole need not be such that after the beginning of the stroke of the sawtooth current a minimum still occurs in the anode current of the tube.

The circuit according to the invention is characterized in that an integrating network is connected in parallel with the winding and part of the output voltage of the said network is supplied, in series with the voltage across the capacitor, to the control grid of the tube. Said output voltage serves as a negative feedback voltage for the tube in order to counteract tolerances in the curvature of the characteristic and disturbances in the anode current due to microphony of the tube. It is noted that it has previously been suggested for this purpose to utilise a negative feedback voltage, but this is derived directly from a winding of the transformer. True the impedance of the deflection coil behaves substantially as a resistor during the stroke of the deflection current, but during the flyback of the deflection current the inductance of the coil is also important and leads to a voltage pulse. In known circuits this voltage pulse is also supplied to the control-grid circuit and this with a polarity increasing the potential of the control grid. The blocking of the anode current of the tube under the action of the fly-back of the voltage of the capacitor is thus impeded, if not made impossible.

In the circuit according to the invention, however, the negative feedback voltage is derived from an integrating network counteracting the differentiating action of the deflection coil during the fly-back, resulting in the pulse. If the time-constant of the said network is equal to the time-constant of the deflection coil, so that the coil and the network are complementary to one another, a voltage pulse does not occur in the control-grid circuit during the fly-back.

In order that the invention may be readily carried into effect, it will now be described, by way of example, with reference to the accompanying drawing.

A capacitor 1 is included in a charging circuit comprising, in addition, the series combination of a winding 2 and a resistor 3. Connected in parallel with winding 2 is an integrating network comprising the series-combination of a resistor 4 and capacitors 5, 6. The capacitors 1 and 6 are included in series in the control-grid circuit of a tube 7. Included between the cathode of this tube and earth is the usual parallel combination of a resistor 8 and a capacitor 9 for producing a negative grid-bias which is supplied via a resistor 10 to the control grid of tube 7. The anode circuit of tube 7 includes the primary winding 11 of a transformer 12. A vertical deflection coil 14 is fed via the secondary winding 13 thereof. The winding 2 constitutes a third winding of transformer 12.

When the capacitor 1 is charged, the voltage at the control grid of tube 7 increases, resulting in an increase of the anode current in a tube and a decrease of the anode voltage of the tube. The winding sense of winding 2 is so chosen that the voltage induced therein is opposite to the voltage appearing across capacitor 1. Since a sawtooth voltage is set up across the primary inductance of transformer 12, such is also the case with the voltage across winding 2. Consequently, the voltage across capacitor 1 is either substantially compensated or over-compensated in the charging circuit for capacitor 1, so that the voltage across capacitor 1 increases substantially linearly or more than linearly with time. The sawtooth voltage across the coil 2 is integrated by the network 4, 5, 6 and the part of the integrated voltage set up across capacitor 6 is made active in the control-grid circuit of tube 7.

If the resistance of the deflection coil is R ohm and the inductance of the deflection coil is L henry, and if the value of resistor 4 is $R_4$ ohm and the capacitors 5 and 6 have capacitances of $C_5$ and $C_6$ farads, it is advantageous if the time-constant $$\frac{L}{R}$$

of the deflection coil is substantially equal to the time-constant $$\frac{R_4 \cdot C_5 \cdot C_6}{C_5 + C_6}$$

of the integrating network.

The discharge circuit of capacitor 1 includes a tube 15. This tube is connected in known manner as a blocking oscillator by means of a feedback coupling of the screen-grid circuit to the control-grid circuit via a transformer 16. The said circuit is preferably so proportioned that, when the capacitor 1 discharges, the voltage across it decreases substantially to zero.

As may be seen from the drawing, the charging circuit and the discharge circuit of capacitor 1 are separate from one another.

What is claimed is:

1. A television deflection circuit comprising an amplifier tube having a control electrode and an output electrode, a transformer having a primary winding connected to said output electrode and also having a secondary winding and a tertiary winding, a deflection coil connected to said secondary winding, a charging capacitor having a terminal connected to an end of said tertiary winding, means exclusive of said tertiary winding for connecting said terminal to said control electrode, a source of charging voltage connected to the other end of said tertiary winding whereby said capacitor is charged through said tertiary winding, periodic discharging means connected across said capacitor, an integrating network connected across said tertiary winding to produce an integrated voltage from the voltage produced across said tertiary winding, and means connected to apply said integrated voltage to said control electrode.

2. A circuit as claimed in claim 1, in which said integrating network comprises a resistor and two additional capacitors connected in series, the last-named two capacitors being connected together and one of them being connected to said terminal, and said control electrode being connected to the junction of said two series-connected capacitors.

3. A circuit as claimed in claim 2, in which said integrating network has a time-constant substantially equal to that of said deflection coil.

References Cited in the file of this patent

UNITED STATES PATENTS

| | | |
|---|---|---|
| 2,562,985 | Kronenberg | Aug. 7, 1951 |
| 2,599,798 | Wissel | June 10, 1952 |
| 2,654,050 | Reinhard | Sept. 29, 1953 |

FOREIGN PATENTS

| | | |
|---|---|---|
| 639,531 | Great Britain | June 28, 1950 |
| 687,469 | Great Britain | Feb. 11, 1953 |
| 708,366 | Great Britain | May 5, 1954 |